United States Patent [19]

Uematsu et al.

[11] Patent Number: 4,666,278
[45] Date of Patent: May 19, 1987

[54] BATTERY CONTAINING APPARATUS FOR CAMERAS

[75] Inventors: Kimio Uematsu; Akira Ezawa, both of Tokyo, Japan

[73] Assignee: Nippon Kogaku K. K., Tokyo, Japan

[21] Appl. No.: 857,632

[22] Filed: Apr. 30, 1986

[30] Foreign Application Priority Data

May 21, 1985 [JP] Japan .............................. 60-75419[U]

[51] Int. Cl.⁴ ........................ G03B 17/02; H01M 2/10
[52] U.S. Cl. .................................. 354/288; 206/233;
429/98; 429/99; 429/159
[58] Field of Search ............... 354/202, 288 R, 288 E,
354/288 A, 288 U; 429/98–100, 159; 206/333

[56] References Cited

U.S. PATENT DOCUMENTS 3,138,080  6/1964  Jacobson ..................... 354/202 X

*Primary Examiner*—W. B. Perkey
*Attorney, Agent, or Firm*—Shapiro and Shapiro

[57] ABSTRACT

A cell containing apparatus for a camera capable of selectively receiving larger or smaller dry cells, the containing apparatus including a housing having a chamber for larger and smaller dry cells with the housing, a holder member and a first cover member used for containing the smaller dry cells, a spacer member and a second cover member used for containing the larger dry cells with the housing.

8 Claims, 8 Drawing Figures

BATTERY CONTAINING APPARATUS FOR CAMERAS

BACKGROUND OF THE INVENTION

1. Field of the Invention

The present invention relates to a camera and more particularly to an improved battery containing apparatus for the camera, said apparatus being capable of selectively containing one of plural sets of dry cells or dry element batteries, each set of which is different in size from the other dry cell sets.

2. Related Background Art

There are known cameras of such a type that a battery containing apparatus comprises a cell receiving chamber capable of selectively receiving one of two sets of dry cells different in size from each other, for example, four AA-type dry cells and four AAA-type dry cells, and a cover for closing the cell receiving chamber. For example, FIG. 8 shows the prior art battery containing apparatus comprising a cell receiving chamber provided on the bottom of a camera housing and capable of selectively receiving two sets of dry cells different in size from each other.

As seen from FIG. 8, a camera housing 1 has its bottom is in which a cell receiving chamber 1b is formed to receive four AA-type dry cells 6 in two lines. When it is wanted to receive a set of four AAA-type cells 2, a cell holder 3 is used and capable of holding the four AA-type dry cells 6 two on each side. After the cell holder 3 holding four dry cells has been received in the cell receiving chamber 1b, a bottom cover 5 is mounted on the camera housing 1 to conceal the dry cells. The cell receiving chamber 1b has a depth slightly larger than the diameter of one AA-type dry cell 6. The cell receiving chamber 1b includes plus and minus terminals 4a, 4b in the form of coil springs mounted on the end wall thereof and a conductive plate 1d mounted on the other end wall of the cell receiving chamber 1b for connecting the four AA-type dry cells 6 with each other in series.

The cell holder 3 is positioned in the cell receiving chamber 1b between the terminals 4a, 4b and the conductive plate 1d and includes plus and minus connection terminals 3a, 3b provided on the end of the cell holder 3 corresponding to the terminals 4a, 4b of the cell receiving chamber 1b and a conductive plate 3c mounted on the other end of the cell holder 3 corresponding to the conductive plate 1d of the cell receiving chamber 3. Thus, the four AAA-type dry cells may be connected in series with each other through coil springs 3d and 3e on the cell holder 3 and may also be coupled through the terminals 4a and 4b of the cell receiving chamber 1b with any electric circuit (not shown) in the camera housing 1. The cell holder 3 has a thickness t at least equal to the diameter of one of larger dry cells (AA-type) and is adapted to be held entirely in the cell receiving chamber 1b through the bottom cover 5. The bottom cover 5 is provided with an opening 5a through which a female thread portion 1c on the bottom of the camera housing 1 can be extened outwardly to receive a male thread portion on any support means such as tripod or the like.

It is again to be noted that the above-mentioned cell receiving chamber has a size sufficient to entirely contain four larger dry cells (AA-type) and must use the cell holder when it is wanted to receive four smaller dry cells (AAA-type) in the cell receiving chamber. It is however desirable that the entire size of the camera is reduced as small as possible. It is apparent that the battery containing apparatus as described in connection with FIG. 8 provides no advantage due to the use of AAA-type dry cells since the cell receiving chamber is formed into such a size that four AA-type dry cells can be received therein. In addition, the type of received dry cells could not be recognized from the outside of the camera.

SUMMARY OF THE INVENTION

It is therefore an object of the present invention to provide a camera having a battery containing apparatus which permits the entire size of the camera to change from one to another depending on the type of dry cells used and which allows the type of dry cells contained therein to be recognized from the outside of the camera.

Another object of the present invention is to provide a camera having a battery containing apparatus which comprises a cell receiving chamber and a cover for closing said chamber such that a set of desired dry cells can positively be held in the cell receiving chamber.

Still another object is to provide a camera having a battery containing apparatus which comprises means for easily and positively mounting the camera housing on any suitable support means such as tripod or the like even if the height of the camera is variable depending on the different sizes of dry cells to be contained in the battery containing apparatus.

A further object is to provide a camera having a battery containg apparatus which can prevented dry cells from being received therein with false polarity.

A further object is to provide a camera having a battery containing apparatus of very simplified construction which can receive any one set of dry cells therein in its proper position.

To accomplish the above objects, the present invention provides a camera comprising a camera housing, a cell chamber in said camera housing for selectively receiving one of two set of larger and smaller dry cells different in size from each other, a cell holder having a thickness substantially equal to the diameter of a smaller dry cell and adapted to hold the set of smaller dry cells in place and to be mounted in said cell chamber, a first cover mounted over said cell chamber to hold said cell holder in said cell chamber, a spacer having a thickness at least equal to a difference between the diameter of a larger dry cell and the thickness of said cell holder and detachable mounted on said camera housing adjacent to said cell chamber, and a second cover for covering said spacer and cell chamber with the set of larger dry cells contained in said cell chamber.

The provision of the first and second covers different in size from each other enables the size of the camera to be reduced when the set of smaller dry cells are used and also the type of received dry cells to be recognized from the height of the first or second cover used without removal of that cover. With the set of larger dry cells to be used, the spacer is mounted on the camera housing adjacent to the cell chamber and further the second cover is mounted on the camera housing over the spacer. Thus, the second cover can positively be mounted on the camera housing. The spacer may include at least one or all of means for positioning any set of dry cells in place, means for preventing the series connection of any set of dry cells when they are improperly housed within the camera with false polarity and thread means for connecting the camera housing with a tripod.

Other object, features and advantages of the present invention will more fully be apparent from the following detailed description of the invention in connection with the attached drawings.

DESCRIPTION OF THE PREFERRED EMBODIMENTS

Figure 1:
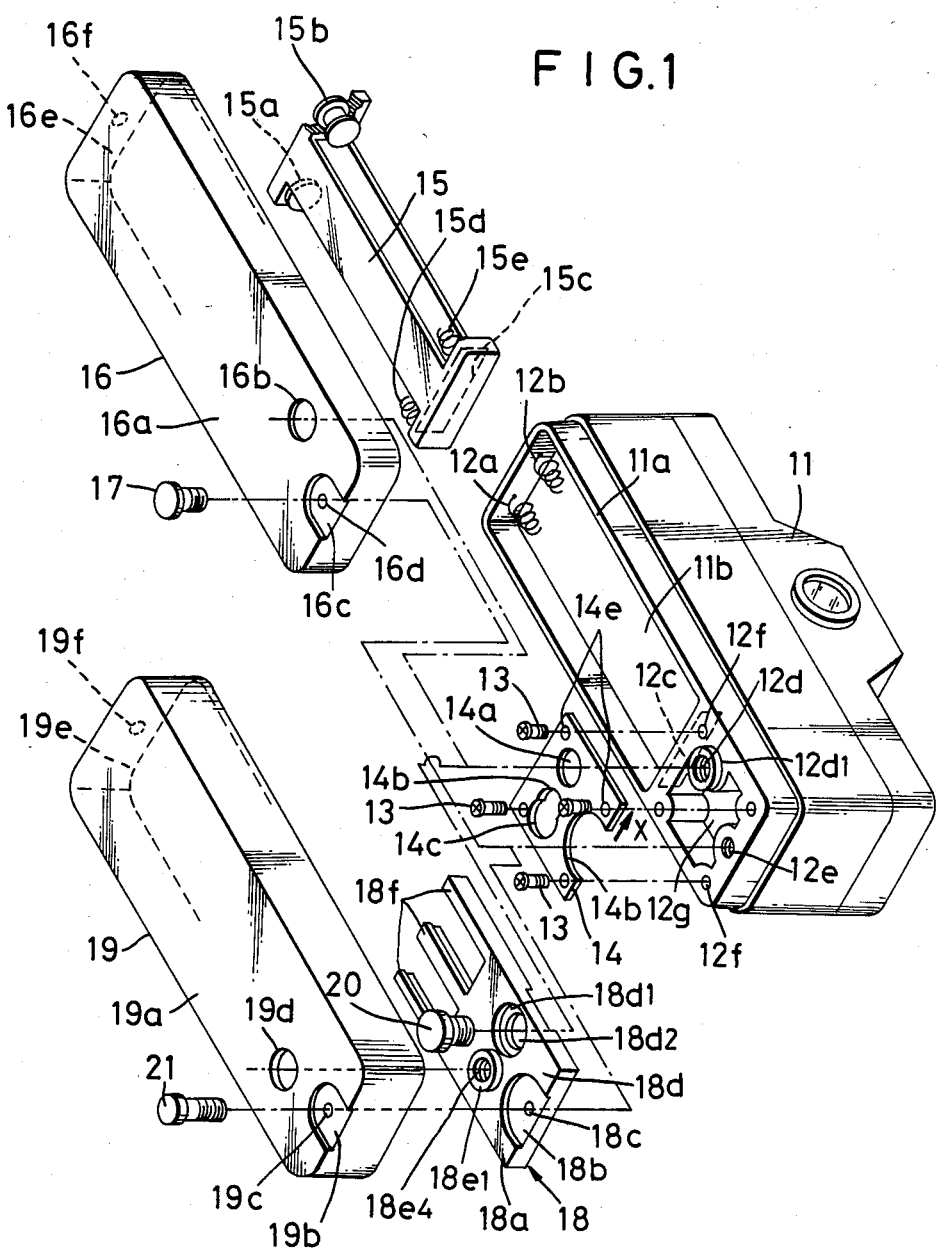
FIG. 1 is a perspective view of one embodiment of the present invention as viewed backward of a camera housing.

Referring now to FIG. 1, there is shown a camera constructed in accordance with to the present invention, which comprises a camera housing 11 and a cell receiving chamber 11b formed in the bottom 11a of the camera housing 11. The cell receiving chamber 11b includes plus and minus terminals 12a, 12b in the form of coil springs provided therein at one end and a short-circuiting terminal 12c provided therein at the other end.

The bottom 11a of the camera housing 11 is provided with a projection $12d_1$ having a female thread 12d adapted to threadedly receive a male thread on a tripod, a threaded aperture 12e threadedly engageable with bottom cover screws 17 and 21 which will be described, threaded apertures 12f threadedly engageable with four machine screws 13, and a lightening recess 12g. On the bottom face 11a of the camera housing 11 is also mounted a fixture plate 14 which is provided with an opening 14a adapted to receive the projection $12d_1$, a semi-circular notch 14b, enlarged and reduced openings 14c, 14d connected with each other, and openings 14e adapted to receive the machine screws 13. Thus, the fixture plate 14 may rigidly be mounted on the bottom face 11a of the camera housing 11 by threading the machine screws 13 into the threaded apertuers 12f of the bottom face 11a through the openings 14e. At this time, the projection $12d_1$ can extend outwardly from the fixture plate 14 through the opening 14a. All the parts aforementioned except the short-circuiting terminal 12c are common to either of AAA-type or AA-type dry cells to be housed within the camera housing 11.

Figure 2:
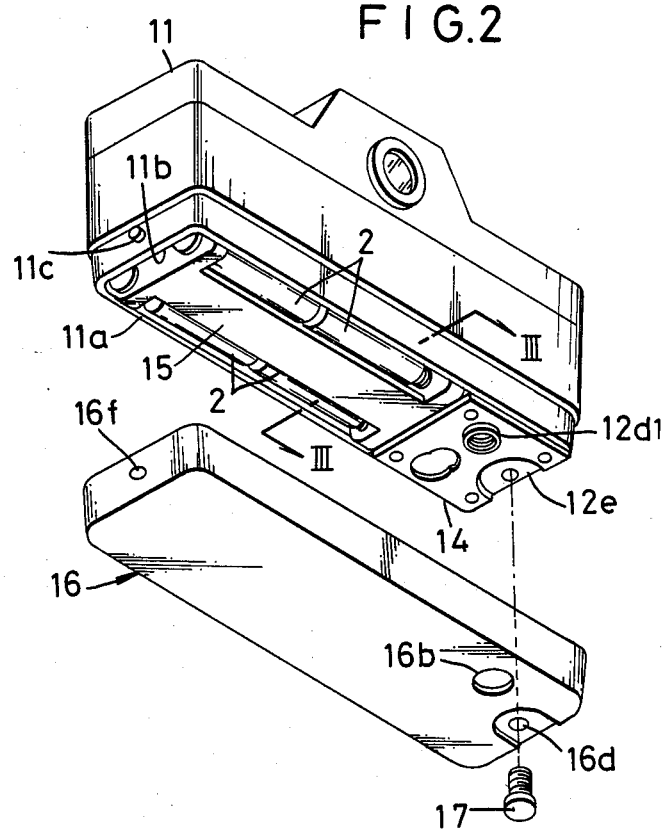
FIG. 2 is a perspective view of a bottom cover immediately before it is mounted on the camera housing after a set of AAA-type dry cells have been received within the cell receiving chamber shown in FIG. 1.

When a set of AAA-type dry cells are to be used in the camera, a cell holder 15 and a bottom cover 16 are utilized for AAA-type dry cells 2 (see FIG. 2). As seen from FIG. 1, the cell holder 15 includes plus and minus connecting terminals 15a, 15b provided thereon at one end. The other end of the cell holder 15 is provided with a conductive plate 15c mounted thereon at the inner face. The cell holder 15 further includes a short-circuiting terminal 15d in the form of a coil spring provided on the conductive plate 15c at a position opposed to the plus connecting terminal 15a and a short-circuiting terminal 15e in the form of a coil spring located on the conductive plate 15c at a position opposed to the minus connecting terminal 15b. Thus, the conductive plate 15c and short-circuiting terminals 15d, 15e will connect four AAA-type dry cells 2 in series when they are held within the cell holder 15 two in one line as shown in FIG. 2. When the cell holder 15 is housed in the cell receiving chamber 11b with four AAA-type dry cells held on the cell holder, the plus connecting terminal 15a is electrically connected with the plus terminal 12a of the cell receiving chamber 11b while the minus connecting terminal 15b is electrically coupled with the minus terminal 12b of the cell receiving chamber 11b. Thus, any internal circuitry (not shown) in the camera housing 11 may selectively be energized by a power supply from the set dry cells.

Figure 3:
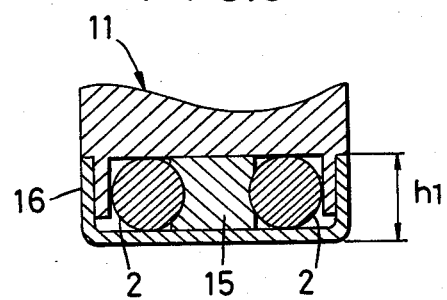
FIG. 3 is a cross-sectional view taken along a line III—III in FIG. 2.

The surface 16a of the bottom cover 16 for AAA-type dry cells is provided with an opening 16b for receiving the projection $12d_1$ on the camera housing 11, a step portion 16c and an opening 16d formed in the step portion 16c and used to fix the bottom cover to the camera housing. The bottom cover 16 also includes an opening 16f formed therethrough at one side well 16e for receiving a set pin which will be described. FIG. 2 shows the bottom cover 16 immediately before it is mounted on the bottom face 11a of the camera housing 11 after the cell holder 15 holding four AAA-type dry cells 2 has been received within the cell receiving chamber 11b as described hereinbefore. The bottom cover 16 is fitted over the bottom face 11a of the camera housing 11 such that the opening 16f thereon will receive a set pin 11c on the camera housing 11 at one side. The bottom cover screw 17 is then threaded into the threaded aperture 12e of the camera housing 11 through the bottom cover fixing opening 16d of the bottom cover 16. As a result, the bottom cover 16 for AAA-type dry cells is rigidly mounted on the bottom face 11a of the camera housing 11. At the same time, the projection $12d_1$ extends outwardly from the bottom cover 16 through the opening 16b therein. FIG. 3 shows the bottom cover 16 mounted on the camera housing 11 after the cell holder 15 with AAA-type dry cells held thereon has been housed within the cell receiving chamber 11b.

When it is to use a set of AA-type dry cells each having a size larger than that of a AAA-type dry cell, a spacer 18 and a bottom cover 19 are utilized as shown in FIG. 1. The outer surface 18a of the spacer 18 is provided with a step portion 18b, an opening 18c formed therethrough at the step 18b, a stepped opening 18d used to fix the spacer 18 to the camera housing 11, three cell holding-down arms 18f defining a fork-shaped configuration. As seen from FIG. 4, the inner surface 18g of the spacer 18 is provided with a stepped shaft 18e which includes a ring-like projection $18e_1$ extending from the outer surface 18a through the spacer 18 as shown in FIG. 1, a neck $18e_2$ extending from the inner surface 18g of the spacer 18 and a head $18e_3$. The ringlike projection $18e_1$ includes a female thread $18e_4$ formed therein in its central axis direction and adapted to engage a male thread on a tripod. The external diameter of the neck $18e_2$ is slightly smaller than the internal diameter of the smaller opening 14d on the fixture plate 14 (see FIG. 1).

On the other hand, the external diameter of the head $18e_3$ is slightly smaller than the internal diameter of the larger opening 14c on the fixture plate 14.

The stepped opening 18d on the spacer 18 includes an enlarged opening portion $18d_1$ leading to the outer surface 18a and an opening $18d_2$ formed through the spacer 18 from the inner face 18g to a step portion 18h.

The outer surface 19a of the bottom cover 19 for AA-type dry cells is provided with a step portion 19b, a bottom cover fixing opening 19c formed therethrough at the step portion 19b and a through-opening 19d adapted to receive the ring-like projection $18e_1$ on the spacer 18. The bottom cover 19 has one side face 19e in which there is formed an opening 19f for receiving the set pin 11c on the camera housing 11 (see FIG. 2).

Figure 4:
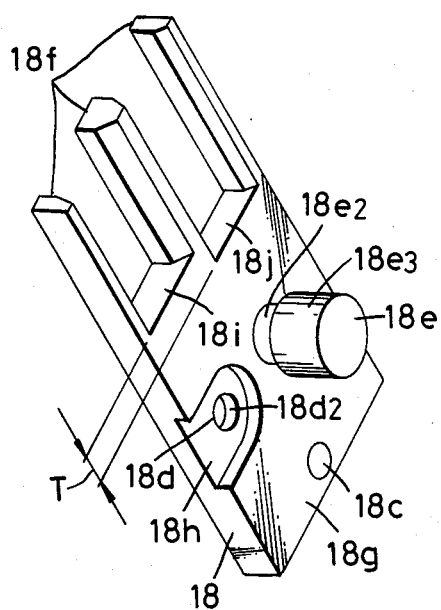
FIG. 4 is a perspective view of the inner face of the spacer shown in FIG. 1.

When the spacer 18 is to be mounted on the fixture plate 14 which has been mounted on the bottom 11a of the camera housing 11, the spacer 18 is placed on the fixture plate 14 such that the head $18e_3$ of the stepped shaft 18e (FIG. 4) will be passed through the larger opening 14c of the fixture plate 14 (FIG. 1) and at the same time the projection $12d_1$ (FIG. 1) will be brought into contact with the step portion 18h (FIG. 4). The spacer 18 is then moved in a direction shown by arrow in FIG. 1 until part of the outer periphery of the neck $18e_2$ contacts the inner periphery of the smaller opening 14d on the fixture plate 14. Thus, the spacer 18 can positively be positioned on the bottom of the camera housing 11. At this time, the head $18e_3$ of the stepped shaft 18e is moved within the lightening recess 12g on the camera housing 11. The step portion 18h on the inner face 18g of the spacer 18 functions relief means for the projection $12d_1$. When the through-openings 18c and $18d_2$ of the spacer 18 are respectively aligned with the threaded aperture 12e and female threaded aperture 12d on the camera housing 11, the spacer fixing screw 20 is threaded into the female threaded aperture 12d through the stepped opening 18d. Thus, the spacer 18 is rigidly mounted on the fixture plate 14. The spacer 18 has sufficient resistance and strength against any force tending to separate the spacer from the fixture plate 14 since the head $18e_3$ of the stepped shaft 18e is engaged by the peripheral edge of the smaller opening 14d of the fixture plate 14 in addition to the connection of the screw 20 with the spacer 18.

Figure 5:
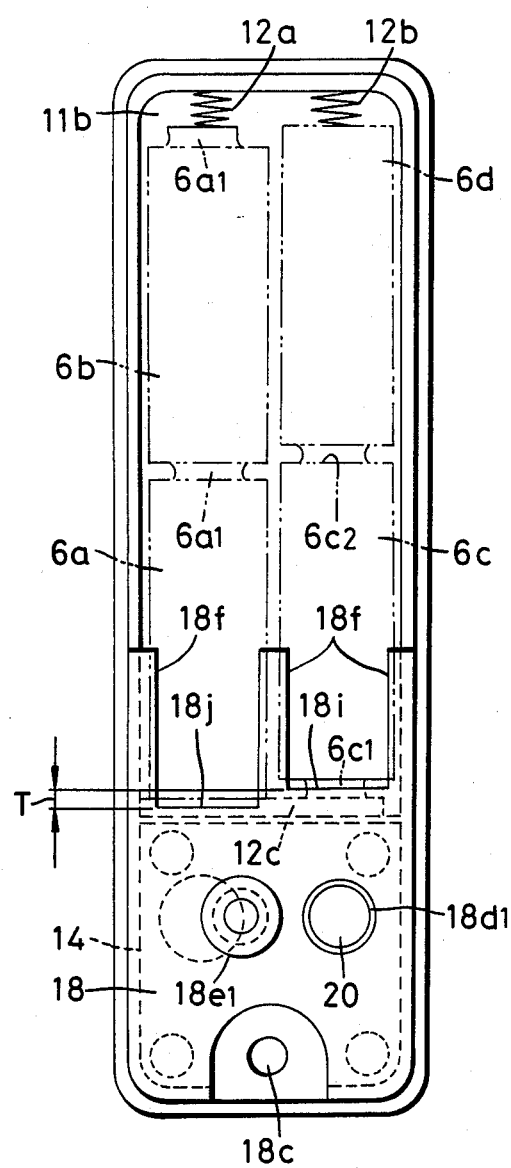
FIG. 5 is a plane view of the spacer mounted in the cell receiving chamber shown in FIG. 1.

FIG. 5 shows four AA-type dry cells 6a to 6d housed in the cell receiving chamber 11b. Two of series connected dry cells 6a and 6d have plus protrusions $6a_1$ and $6d_1$ directed to the plus terminal 12a of the cell receiving chamber 11b while the remaining dry cells 6c and 6d connected in series with each other have plus protrusions $6c_1$ and $6d_1$ directed toward the shortcircuiting terminal 12c of the cell receiving chamber 11b. Under this normal condition, all of the four dry cells 6a to 6d are connected in series through the short-circuiting terminal 12c with the plus and minus terminals 12a and 12b completing a power supply circuit for any internal electrical circuit in the camera housing 11 (FIG. 1).

Figure 6:
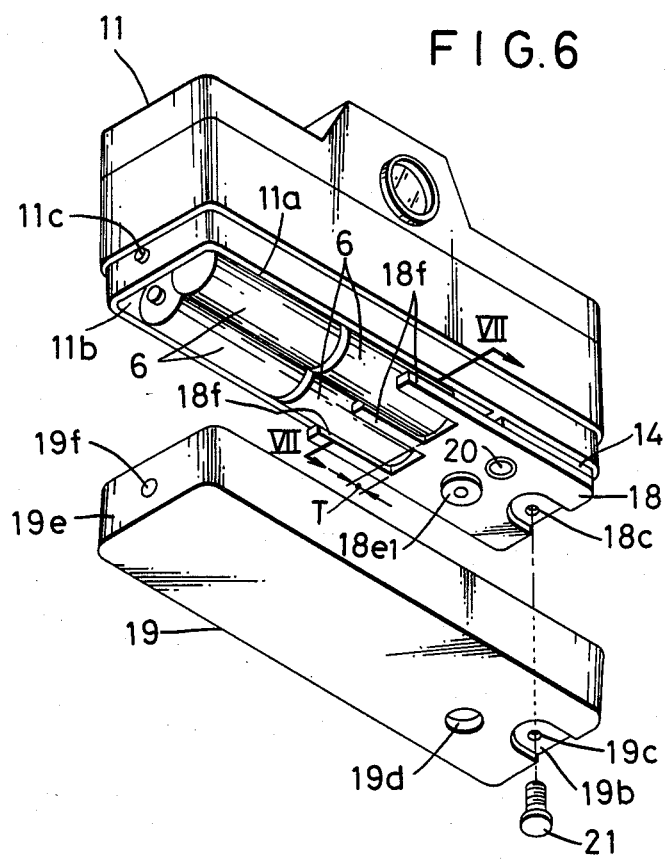
FIG. 6 is a perspective view of the bottom cover immediately before it is mounted on the camera housing after a set of AA-type dry cells are housed within the cell receiving chamber shown in FIG. 1.

Each of the cell holding-down arms 18f extends midway from the end of each of the dry cells 6a and 6c and these arms 18f hold the dry cells 6a and 6c such that they will not be moved outwardly from the cell receiving chamber 11b, as best seen from FIG. 6.

A end wall 18i between the central and left-hand (as viewed in FIG. 4) arms 18f is raised, by a distance t, from another end wall 18j between the central and right-hand (as viewed in FIG. 4) arms 18f. This distance T is slightly smaller than the length of the plus protrusion of each of the dry cells. The end wall 18i of the spacer 18 is such that it can engage the end face (for example, $6c_2$) of the dry cell on the side of its minus polarity but not the plus protrusion (for example, $6c_1$) of the dry cell when four AA-type dry cells 6 are housed within the cell receiving chamber 11b and the spacer 18 is rigidly mounted on the fixture plate 14, as shown in FIG. 5.

Figure 7:
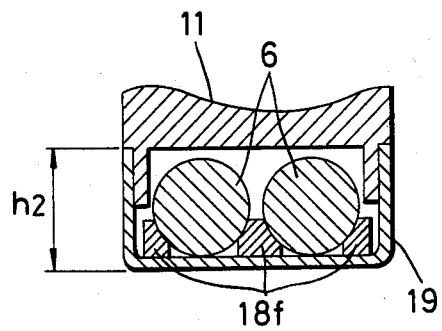
FIG. 7 is a cross-sectional view taken along a line VII—VII in FIG. 6.
Figure 8:
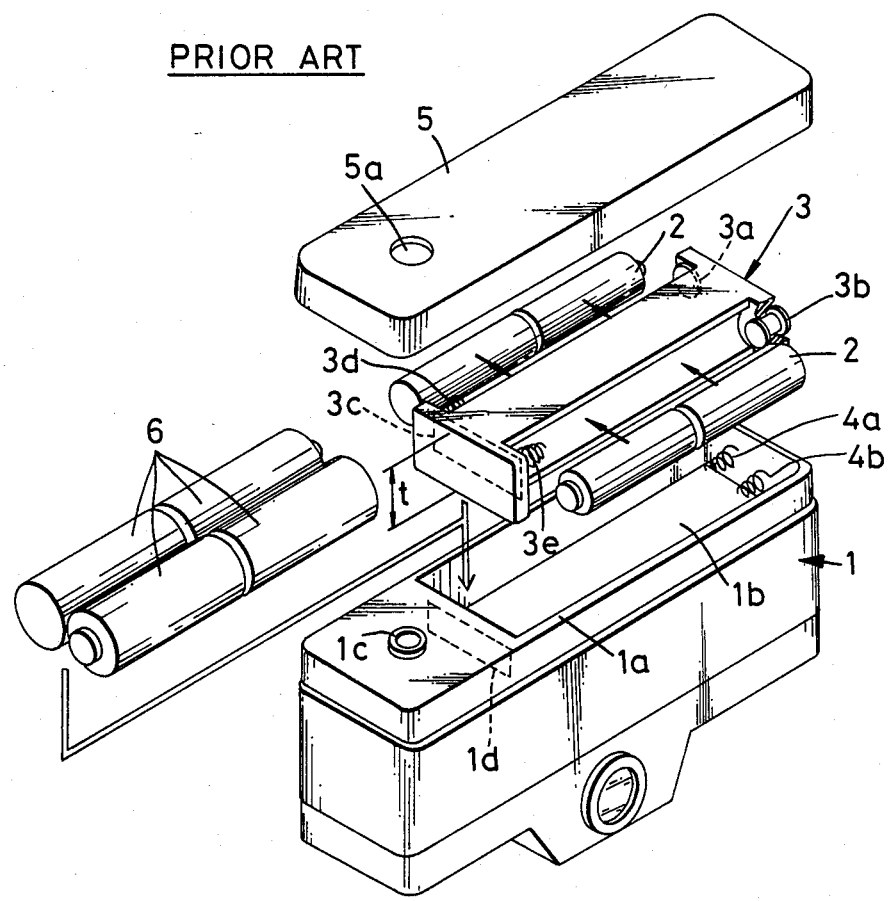
FIG. 8 is a perspective view of a battery containing apparatus constructed according to the prior art.

As described hereinbefore, two of the four dry cells 6a and 6c are first received in the cell receiving chamber 11b out of the cell holding-down arms 18f and then moved toward the short-circuiting terminal 12c in the cell receiving chamber 11b until these dry cells are placed in a position shown in FIG. 7. If one of the two dry cells 6c is charged with its false orientation, that is, with its plus protrusion $6c_1$ directed to the minus terminal 12b and even when the dry cell 6c is moved to contact its minus end face $6c_2$ with the shortcircuiting terminal 12c, part of the minus end face $6c_2$ will be engaged by the end wall 18i of the spacer 18 before contacting the short-circuiting terminal 12c. Even though the other three dry cells 6a, 6b and 6d are housed in the cell receiving chamber 11b, the internal circuitry (not shown) in the camera housing 11 cannot be completed to damage it.

After four AA-type dry cells 6 have been housed within the cell receiving chamber 11b at their normal positions, the bottom cover 19 for AA-type dry cells is placed over the bottom face 11a of the camera housing 11 such that the set pin 11c of the camera housing 11 shown in FIG. 6 will be fitted into the opening 19f on the bottom cover 19. The bottom cover screw 21 is then threaded into the threaded aperture 12e (FIG. 1) on the camera housing 11 thorugh the through-openings 19c and 18c on the bottom cover and spacer 19 and 18, respectively. As a result, the bottom cover 19 will rigidly be mounted on the bottom of the camera housing 11. At the same time, the ring-like projection $18e_1$ of the stepped shaft 18e is passed through the through-opening 15d. FIG. 7 shows the botom cover 19 completely mounted over the bottom face 11a of the camera housing 11 after the four dry cells 6 have been housed within the cell receiving chamber 11b as shown in FIG. 6.

In comparison of FIG. 7 with FIG. 3, it will be understood that when AAA-type dry cells are used, the entire size of the camera can correspondingly be reduced since the bottom cover 16 for AAA-type dry cells has a height $h_1$ smaller than a height $h_2$ in the bottom cover 19 for AA-type dry cells. This also permits an operator to visually discriminate the type of dry cells which are presently housed within the cell receiving chamber 11b.

In the described embodiment, the spacer 19 used for AA-type dry cells 6 of larger size includes the female threaded opening $18e_4$, the cell holding-down arms 18f as means for holding the dry cells in place and the end wall 18i as means for preventing the dry cells from being housed in the cell receiving chamber with false orientation.

Although the present invention has been described as to the battery containing apparatus adapted to the bottom of the camera, it may similarly be applied to the side portion of the camera housing.

Although the present invention also has been described as to AA-type and AAA-type dry cells, it may be applied to use two or all types of A-type, AA-type and AAA-type dry cells.

What we claimed is: -

1. A cell containing apparatus for a camera capable of selectively receiving one of sets of larger and smaller dry cells different in diameter from each other, said apparatus comprising;
   a camera housing having a cell chamber therein;
   a holder member having a thickness substantially equal to a diameter of said smaller dry cells and adapted to be mounted in said cell chamber with said smaller dry cells held on said holder member;
   a first member for covering said cell chamber with said holder member housed within said cell chamber held;
   a spacer member having a thickness matching a difference between a diameter of said larger dry cells and the diameter of said smaller dry cells and detachably mountable on said camera housing adjacent to said cell chamber; and
   a second member for covering said spacer and cell chamber together with said larger dry cells housed within said cell chamber.

2. A battery containing apparatus as defined in claim 1 wherein said spacer member includes means for positioning said larger dry cells.

3. A battery containing apparatus as defined in claim 1 wherein said spacer member includes means for preventing electrical connection of said larger dry cells when they are housed with false orientation.

4. A battery containing apparatus as defined in claim 1 wherein said spacer member includes a female threaded portion used to threadingly connect said camera housing with a tripod and wherein said second cover member includes an opening formed therein through which said female threaded portion on said spacer member is exposed externally.

5. A battery containing apparatus as defined in claim 1 wherein said spacer member includes at least one positioning arm extending into said cell chamber for positioning said larger dry cells, a thread portion used to connect said camera housing with a tripod, and an end portion for engaging the peripheral end of one of said larger dry cells to prevent electrical connection of that larger dry cell when it is housed within said cell chamber with false orientation.

6. A battery containing apparatus as defined in claim 1, further comprising a projection located on the camera housing adjacent to said cell chamber and having a female thread engageable with a tripod, a fixture plate disposed adjacent to said cell chamber and having an opening through which said projection extends, and a spacer fixing screw adapted to thread into said female thread portion for detachably mounting said spacer member on said fixture plate.

7. A battery containing apparatus as defined in claim 6 wherein said spacer member includes another female thread similar to said first-mentioned female thread and wherein said second cover member includes an opening through which said another female thread is exposed externally.

8. A battery containing apparatus as defined in claim 6 wherein said spacer member includes a stepped shaft having an enlarged-diameter head portion, a reduced-diameter neck portion connected at one end with said head portion, and a female threaded portion formed on said neck portion at the other end and wherein said fixture plate includes an enlarged-diameter opening through which said head portion of said stepped shaft can be passed and a groove shaped opening communicating with said enlarged-diameter opening and into which said head portion of said stepped shaft can be fitted, whereby said fixture plate can be held between the inner face of said spacer member and said head portion of said stepped shaft when said head portion is fitted into said groove-shaped opening.

* * * * *